UNITED STATES PATENT OFFICE.

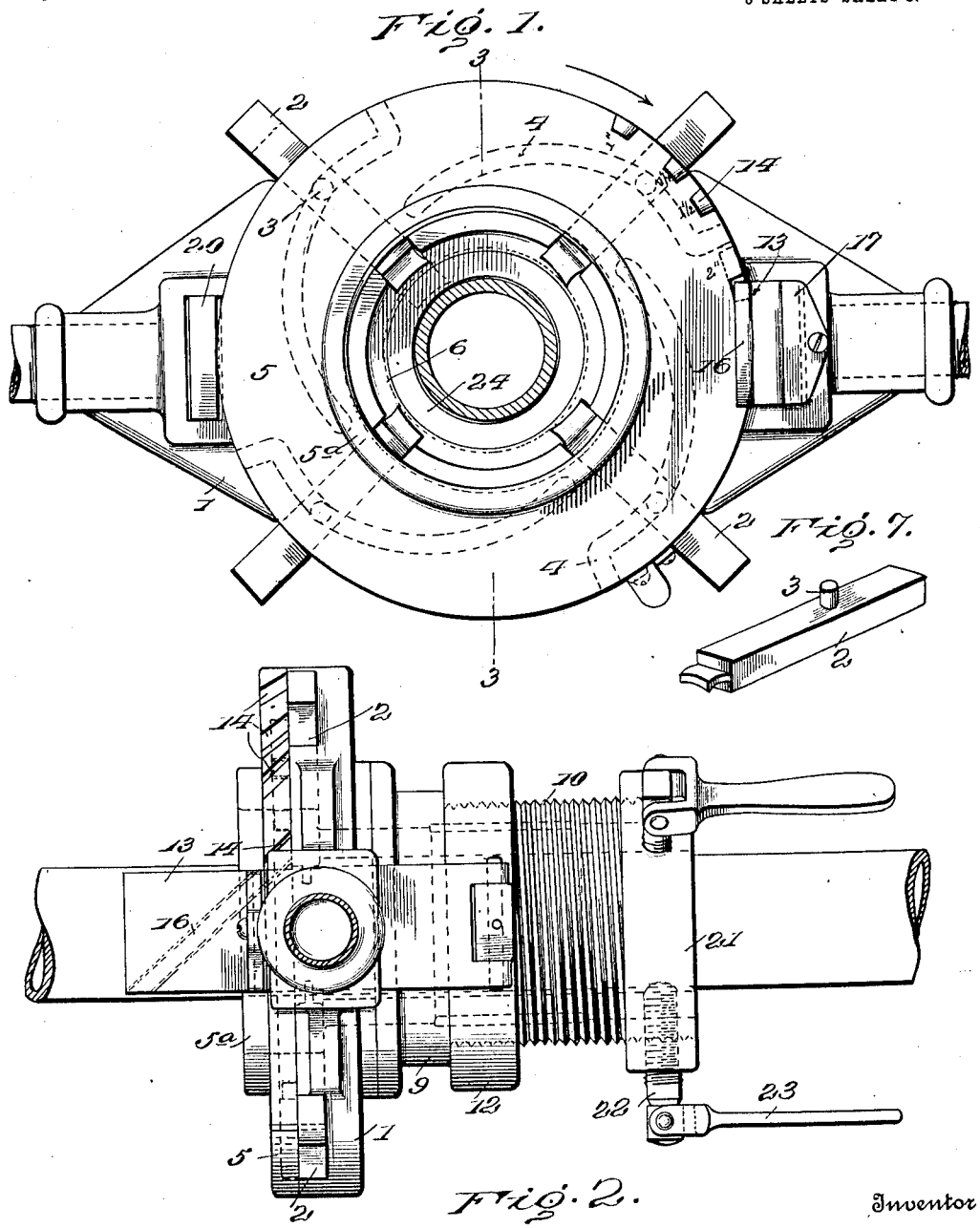

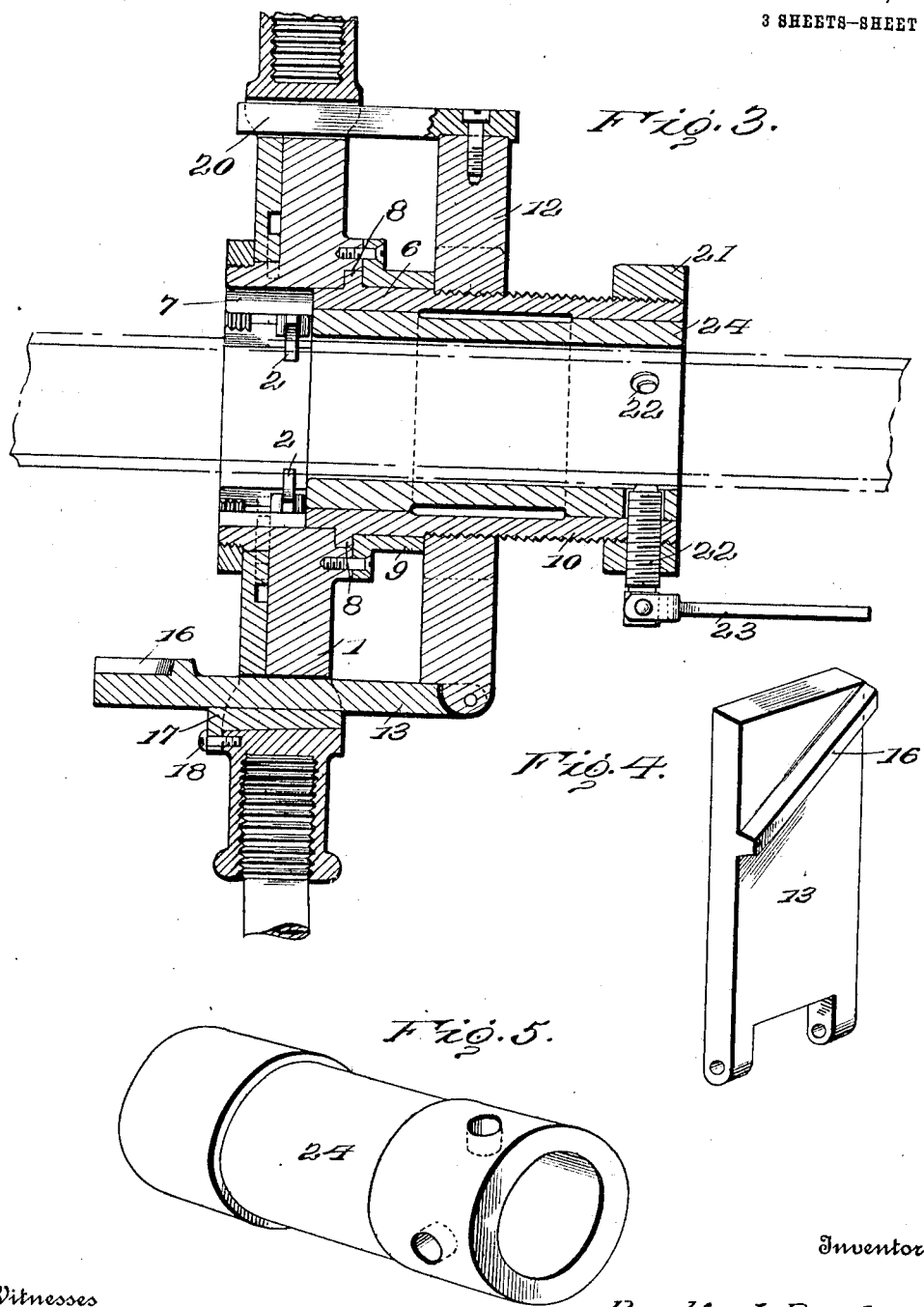

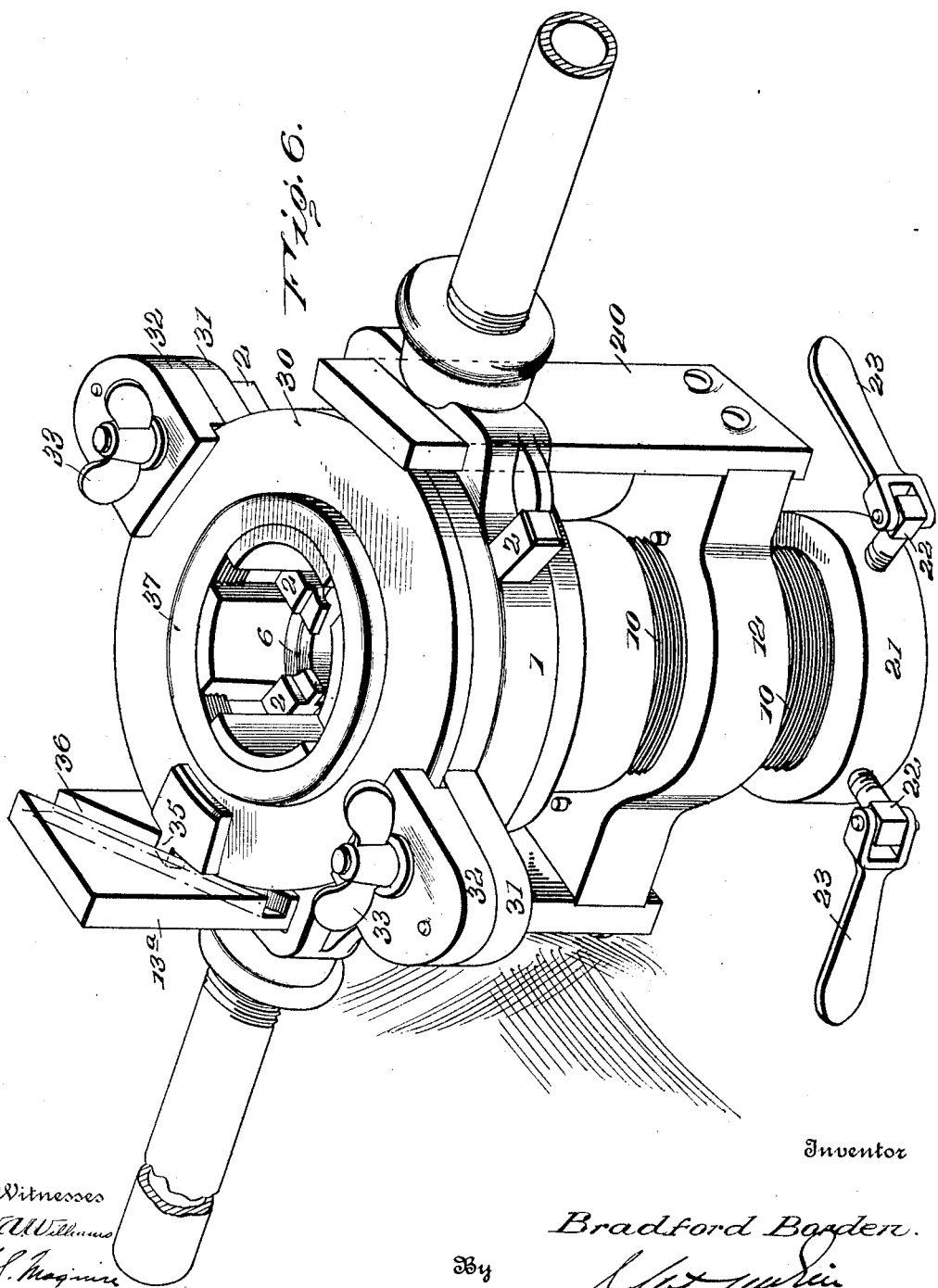

BRADFORD BORDEN, OF TORONTO, ONTARIO, CANADA, ASSIGNOR TO THE BORDEN COMPANY, OF WARREN, OHIO, A CORPORATION OF OHIO.

PIPE-CUTTING TOOL.

1,020,795.

Specification of Letters Patent. Patented Mar. 19, 1912.

Application filed December 19, 1910. Serial No. 598,007.

*To all whom it may concern:*

Be it known that I, BRADFORD BORDEN, of Toronto, in the Province of Ontario and Dominion of Canada, have invented certain new and useful Improvements in Pipe-Cutting Tools; and I do hereby declare the following to be a full, clear, and exact description of the invention, such as will enable others skilled in the art to which it appertains to make and use the same.

The primary object of this invention is to provide extremely simple and highly efficient means for cutting pipe without the formation of burs; and further objects are to provide means whereby pipe may be cut in much shorter time than has heretofore been possible with hand operated tools; and to enable pipes of different diameters to be cut with one and the same set of cutters.

Briefly outlined, the invention embodies a rotatable carrier for a series of inwardly movable pipe cutters, a cutter-engaging or cam-plate for simultaneously controlling all of the cutters, and a member having a longitudinal movement relatively to the carrier for imparting to the cam-plate a rotary motion independent of its rotation with the cutter-carrier for causing all of the cutters to simultaneously move inwardly to effect the cutting of a pipe as said member travels longitudinally in relation to the carrier. According to the preferred form of construction the member which causes the inward travel of the cutters may be caused to engage the cam plate at a plurality of points to provide the necessary range of adjustment for cutting pipes of different sizes. If desired, however, the necessary adjustment of the cutters may be obtained by having the cam-plate detachably locked to a second plate, and in this event the latter plate will have an interlocking engagement with the longitudinally movable member to cause the inward travel of the cutters. I also employ removable bushings for providing firm bearings for pipes of different sizes.

The invention will be hereinafter fully set forth and particularly pointed out in the claims.

In the accompanying drawings, Figure 1 is an end elevation of the preferred form of embodiment. Fig. 2 is a side elevation. Fig. 3 is a vertical longitudinal sectional view on line 3—3, Fig. 1, with the cutters removed and showing parts detached. Fig. 4 is a face view of the cam-engaging member. Fig. 5 is a view of one of the bushings removed. Fig. 6 is a view in perspective showing a slight modification. Fig. 7 shows one of the cutters.

Referring to the drawings, 1 designates a rotatable housing or carrier having a series of radially arranged guideways which accommodate a series of radially movable pipe cutters 2. Each of these cutters has a blade-like end and is preferably provided with an outwardly projecting lug 3. The several lugs of all the cutters are designed to fit in eccentrically arranged slots 4 of a cam plate 5, which latter fits over the outer face of the cutter carrier and is designed to rotate with such carrier and to have a rotary motion independently thereof for simultaneously controlling and moving inwardly all of the cutters. The cam-plate is held in place by a nut $5^a$.

The cutter-carrier is journaled on a cylindrical bearing which is shown in the form of a sleeve 6, which latter at its forward edge projects into a counterbored opening 7 of the carrier, the latter having a central opening therethrough into which the cutters project. Sleeve 6 has an external flange 8 which is held against the rear wall of the carrier by a collar 9 encircling sleeve 6 and secured by screws passed through coincident openings in a flange of the collar and the rear wall of the cutter-carrier. By thus connecting the carrier to sleeve 6 an extended bearing is provided for the carrier on the sleeve, and while the carrier may revolve on the sleeve it has no longitudinal travel thereon.

That portion of sleeve 6 in rear of collar 9 is provided with an external screw thread 10 whereon is mounted a rotatable and longitudinally movable collar 12 having an internally threaded opening for engaging the screw thread. This collar constitutes a support for the cam-controlling member, which is shown in the form of a post 13 which has a longitudinal movement relatively to the cutter-carrier while partaking of the rotary motion thereof. By forming an interlocking connection between post 13 and the cam plate 5 an independent rotary motion may be imparted to the latter to simultaneously force all the cutters inwardly. According to the preferred means of construction for securing this independent rotation of the cam plate, I provide the latter with a notch or cut-out 14 in its periphery for interlocking with a diagonally arranged lug 16 extending over the inner face of post 13. For the purpose of securing the necessary adjustment and to provide for pipes of different sizes, the cam-plate is formed with additional notches similar to notch 14, any one of which may be placed in interlocking engagement with the lug of the post. For the purpose of enabling the interlocking engagement between the cam-plate and post to be adjusted various means may be employed, but according to that shown the post 13 is hinged or otherwise pivotally secured to collar 12. To permit post 13 to be turned on its pivot, to disengage cam 5, I provide a block 17 which is shown in the form of a wedge removably held by a screw 18 in the opening of an extension of the housing through which opening post 13 is projected. By removing block 17 the post may be turned on its pivot and its lug freed from engagement with the cam plate. The cutter carrier is provided with opposite internally threaded sockets 19 for accommodating removable handles by which the carrier may be axially rotated on a pipe to be cut. For the purpose of equally balancing the collar 12, a second post 20 may be secured thereto and projected through an opening in the cutter carrier.

On the rear end of sleeve 6 is fitted a collar 21 through which a locking bolt 22 projects, such locking bolt preferably having a pivoted handle 23.

To enable the tool to be applied to pipes of different sizes I may employ any desired number of removable bushings, one of which is shown at 24, such bushings extending through the sleeve 6 to a point flush with the forward end thereof, and at its opposite ends has circumferential enlargements to secure the necessary bearings, the enlargement at the rear end being formed with an opening to accommodate bolt 22. I have shown each eccentric slot of the cam-plate terminating in lateral branches to permit each cutter to be readily removed.

From what has been said it will be seen that by slipping the tool over a pipe securely held in a vise, or the like, until the point at which the pipe is to be severed is in line with the inner ends of the series of inwardly movable cutters, the tool may be clamped to the pipe by tightening bolt 22. The pipe cutters are, of course, previously adjusted to suit the size of the pipe to be cut. Thereupon the operator revolves the cutter-carrier on its fixed bearing, and during the revolution of the carrier the post 13 not only partakes of the rotary motion of the carrier, but by reason of the engagement of its collar 12 with screw 10 also moves longitudinally, the carrier itself not having any longitudinal movement. During this longitudinal movement of the post the cam plate, which rotates with the carrier, is given an independent partial rotation and thereby simultaneously controls and forces all of the cutters inwardly to effect the severance of the pipe. This will be accomplished, under ordinary circumstances, in about four or five revolutions of the carrier, and the cutters will remove the metal from the pipe, without a wedging action, as is common with pipe cutters in general use, and thus avoid leaving a bur on the end of the pipe. The tool may then be removed from the pipe simply by loosening bolt 22. I have shown four cutters, but if one or even three of them should be broken, the pipe will be cut by the remaining cutter or cutters.

It is to be understood that my invention is not limited in its application to the employment of the precise means shown and described, as such means may be varied widely without departing from the spirit of the invention. Thus instead of forming the cam plate with a series of notches in its periphery and pivotally mounting the post on its support, the necessary range of adjustment of the cutters to accommodate pipes of different sizes may be obtained by the employment of a second plate 30 of substantially the same circumference as the cam plate, and this second plate may be detachably locked to the cam plate by any suitable means, and when this second plate is employed it has the necessary interlocking engagement with the post to secure the desired independent rotation of the cam plate. I have shown such construction in Fig. 6, wherein the cam plate is indicated as provided with opposite lateral extensions 31 to which clamping plates 32 may be held by winged nuts 33 working on screws projecting upwardly from extensions 31 and through openings in such clamping plates. In this same figure I have shown the second plate as having a laterally extending lug 35 projecting into a diagonally arranged groove 36 of post 13ᵃ. The second plate is held in place by a nut 37. When this form of construction is employed, in order to adjust the cutters to pipes of different sizes the operator releases the two clamping plates so that the cam plate may be turned axially independently of the second plate, to set the chasers, and when this has been done the nuts are tightened so that when the carrier is rotated in the usual manner the several cutters will be forced inwardly by the interlocking engagement between the second plate and the post, the longitudinal travel of the latter causing both the cam plate and the second plate to partially rotate independently of their rotation with the cutter carrier.

I claim as my invention:—

1. A pipe cutter comprising a rotatable carrier, a series of inwardly movable pipe cutters mounted in such carrier, a single element for simultaneously moving all of the cutters inwardly, such single element being movable with and independently of the carrier, and means rotatable with the cutter carrier and having a longitudinal movement relatively thereto for causing the independent movement of said single element to simultaneously move all the cutters inwardly toward the center of the carrier.

2. A pipe cutter comprising a rotatable carrier, a series of inwardly movable pipe cutters mounted in such carrier, a single element for simultaneously moving all of the cutters inwardly, such single element being movable with an independently of the carrier, and means for causing the independent movement of said single element to simultaneously move all the cutters inwardly, such means comprising a member having a longitudinal movement relatively to the carrier and rotatable with the latter, such member having an interlocking engagement with said single element.

3. A pipe cutter comprising a bearing designed to be fixedly secured to a pipe, a carrier rotatably mounted on said bearing, a series of radially arranged pipe cutters mounted in said carrier, a cam plate rotatable with and also relatively to said carrier for simultaneously moving all of the cutters inwardly, a member rotatable with said carrier for causing the independent rotation of said cam plate, and a support for said member rotatable on and movable longitudinally of said bearing.

4. A pipe cutter comprising a bearing designed to be fixedly secured to the pipe to be cut, a carrier rotatable on said bearing, a series of radially-arranged cutters mounted in such carrier, means for controlling the cutters, such means being rotatable with and having a movement relative to the carrier during such rotation, and a support for said controlling means, which support encircles, and is designed to travel longitudinally of, said bearing when the carrier is rotated.

5. A pipe cutter comprising a bearing designed to be fixedly secured to the pipe to be cut and having an external screw thread, a carrier rotatable on said bearing, a series of radially-arranged cutters mounted in said carrier, means for controlling the cutters, such means being rotatable with the carrier and having a movement relative thereto during such rotation, and a support for said controlling means comprising an internally threaded collar which is designed to travel on said screw thread when the carrier is rotated.

6. A pipe cutter comprising a bearing designed to be fixedly secured to a pipe and having an external screw-thread, a carrier rotatable on said bearing, a series of radially arranged cutters mounted in said carrier, a cam plate for simultaneously moving all of the cutters inwardly, a member rotatable with the carrier and movable longitudinally relatively thereto for causing the cam plate to turn independently of the carrier to simultaneously move all of the cutters inwardly, and a support for said member comprising an internally-threaded collar which is designed to travel on said screw-thread when the carrier is rotated.

7. A pipe cutter comprising a rotatable carrier, a fixed bearing therefor, a series of radially-arranged pipe cutters, a cam plate rotatable with and independently of the carrier for simultaneously moving all of the cutters inwardly, a post having an interlocking engagement with said cam plate for causing the independent rotation thereof, said post being revoluble with said carrier and having a longitudinal movement relatively thereto, and a support for said post axially mounted on said bearing.

8. A pipe-cutter comprising a rotatable carrier, a fixed bearing therefor, a series of cutters mounted in said carrier, a cam plate rotatable with and independently of said carrier, said cam plate having a notch in its periphery, a post rotatable with said carrier and having a longitudinal movement relatively thereto, said post having a diagonally-arranged lug for interlocking with said notch, and a support for said post rotatable on and movable longitudinally of said bearing.

9. A pipe cutter comprising a rotatable carrier, a fixed bearing therefor, a series of cutters mounted in said carrier, a cam plate rotatable with and independently of said carrier, said cam plate having a series of notches in its periphery, a post projected through an opening in said carrier and having a longitudinal movement relatively thereto, said post having a diagonally arranged lug for interlocking with any one of said notches, a support for said post to which it is pivotally secured, said support being rotatable on and movable longitudinally of said bearing, and removable means for holding the post in fixed engagement with the cam.

10. A pipe cutter comprising a rotatable carrier, a fixed bearing therefor, a series of cutters mounted in said carrier, a cam plate rotatable with and independently of said carrier, said cam plate having a series of notches in its periphery, a post projected through an opening in said carrier and having a longitudinal movement relatively thereto, said post having a diagonally arranged lug for interlocking with any one of said notches, a support for said post to which it is pivotally secured, said support being rotatable on and movable longitudinally of said bearing, and a block removably secured to the carrier for holding the post in engagement with the cam-plate.

In testimony whereof, I have signed this specification in the presence of two subscribing witnesses.

BRADFORD BORDEN.

Witnesses:
J. NOTA McGILL,
FRANCIS S. MAGUIRE.

Copies of this patent may be obtained for five cents each, by addressing the "Commissioner of Patents, Washington, D. C."